United States Patent
Suresh et al.

(10) Patent No.: US 10,091,339 B2
(45) Date of Patent: Oct. 2, 2018

(54) STAGING A MOBILE DEVICE WITH A BATTERY OF THE MOBILE DEVICE

(71) Applicant: SYMBOL TECHNOLOGIES, INC., Lincolnshire, IL (US)

(72) Inventors: Raj V. A. Suresh, Bangalore (IN); Sateesh Veerabhadrappa Angadi, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 100 days.

(21) Appl. No.: 14/024,217

(22) Filed: Sep. 11, 2013

(65) Prior Publication Data

US 2015/0072741 A1    Mar. 12, 2015

(51) Int. Cl.
| | |
|---|---|
| *H04M 1/02* | (2006.01) |
| *H04L 29/08* | (2006.01) |
| *H01M 10/42* | (2006.01) |
| *H04W 4/50* | (2018.01) |
| *H04W 4/14* | (2009.01) |
| *H04W 12/02* | (2009.01) |

(52) U.S. Cl.
CPC ..... *H04M 1/0262* (2013.01); *H01M 10/4257* (2013.01); *H04L 67/303* (2013.01); *H04L 67/34* (2013.01); *H04W 4/50* (2018.02); *H01M 2010/4278* (2013.01); *H01M 2220/30* (2013.01); *H04W 4/14* (2013.01); *H04W 12/02* (2013.01)

(58) Field of Classification Search
CPC ....... H04W 52/02; H04W 4/001; H04W 4/14; H04W 12/02; H04M 1/0262; H04M 19/08; H04B 1/3883; Y02E 60/12; H01M 10/4257; H01M 2010/4278; H01M 2220/30; H04L 67/303; H04L 67/34
USPC ........................................................ 455/572
See application file for complete search history.

(56) References Cited

U.S. PATENT DOCUMENTS

| | | | |
|---|---|---|---|
| 6,097,175 A | 8/2000 | Yoon | |
| 6,931,481 B2 | 8/2005 | Montero | |
| 7,306,153 B2 | 12/2007 | Chong | |
| 8,339,239 B2 | 12/2012 | Kirkjan | |
| 8,375,441 B2 | 2/2013 | Hammad | |
| 2004/0202024 A1* | 10/2004 | Shinagawa | G11C 16/107 365/185.29 |
| 2007/0123304 A1* | 5/2007 | Pattenden | G06F 1/26 455/557 |
| 2008/0238358 A1* | 10/2008 | Koide | G06F 1/26 320/106 |

(Continued)

FOREIGN PATENT DOCUMENTS

WO    2011050166 A2    4/2011

*Primary Examiner* — Lester Kincaid
*Assistant Examiner* — William Wang

(57) ABSTRACT

A system configures a mobile device. The system includes a battery and a mobile device. The battery includes at least one power storage cell and a memory arrangement, the memory arrangement storing staging profile data, the staging profile data including configuration data. The mobile device is configured to be coupled to the battery, the mobile device being powered by the at least one power storage cell, the mobile device receiving the staging profile data from the memory arrangement, the mobile device being automatically configured for communication with a communication network as a function of the configuration data.

20 Claims, 3 Drawing Sheets

(56) References Cited

U.S. PATENT DOCUMENTS

| | | | |
|---|---|---|---|
| 2009/0125979 A1* | 5/2009 | Shimada | G06F 1/28 726/2 |
| 2010/0093273 A1* | 4/2010 | Hohl | H04M 1/72522 455/7 |
| 2012/0087071 A1* | 4/2012 | Yang et al. | 361/679.01 |
| 2012/0123883 A1* | 5/2012 | Charrat | 705/17 |
| 2012/0149343 A1* | 6/2012 | Sanka | H04M 11/08 455/413 |
| 2012/0151022 A1* | 6/2012 | Ayyagari | G06F 1/1632 709/222 |
| 2012/0200173 A1* | 8/2012 | Liu | G06F 1/1613 307/116 |
| 2012/0274266 A1* | 11/2012 | Yip | H02J 7/0004 320/106 |

* cited by examiner

STAGING A MOBILE DEVICE WITH A BATTERY OF THE MOBILE DEVICE

BACKGROUND OF THE INVENTION

A mobile unit (MU) may be configured with a transceiver to communicate with a network. However, in order for the MU to properly connect to the network, the MU has to initially be configured to be managed and be discovered on a management system of the network. Specifically, the MU has to be staged that enables the configuration of the MU. Staging is a process of quickly preparing the MU to deploy into an enterprise by providing settings to configure connectivity to the enterprise network, to configure access to a deployment server, and to specify the deployment to be performed.

Conventional manners of staging the MU are often time consuming and may be inefficient. In a first example, a manual staging process may be performed. However, a manual staging requires the user to manually enter all the required settings. In a second example, staging of the MU may utilize short message service (SMS) messages. In SMS staging, a services platform converts a selected staging profile into a sequence of encrypted SMS messages to the MU using one or more carriers. The SMS messages may be delivered to devices via email to SMS gateways provided by the carriers and/or via short message peer-to-peer protocol (SMPP) gateways contracted for with the carriers. However, with SMS staging, a variety of information is required prior to delivery of the staging profile such as phone number, equipment identification, carrier, etc. Depending on the method of delivery, the messages may be delivered slowly or delayed resulting in an increased time for staging. The manner for delivering the staging profile by the carriers may also be limited such as restrictions or capabilities of the carrier. Also depending on the manner for delivering the staging profile, a fee may be assessed by the carrier. In a third example, specialized staging manners may be used in which specialized components are required in addition to the components of the MU in order to receive the staging profile. However, if the MU does not include these specialized components, the staging profile may not be received by the MU using the respective specialized staging manner.

The MU may also be configured with a portable power supply. In a particular type of portable power supply, a smart battery may be utilized in which a smart battery system (SBS) is provided. The SBS is a specification for determining various energy parameters related to the smart battery. The SBS may provide data related to a current amount of energy remaining in the smart battery, an amount to be charged when the smart battery is connected to a further power supply, etc. Accordingly, the smart battery used in the SBS may include its own circuitry such as a processor and a memory arrangement. However, this circuitry is used exclusively for the SBS.

Accordingly, there is a need for taking advantage of already existing circuitry of a smart battery in order to stage the MU.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
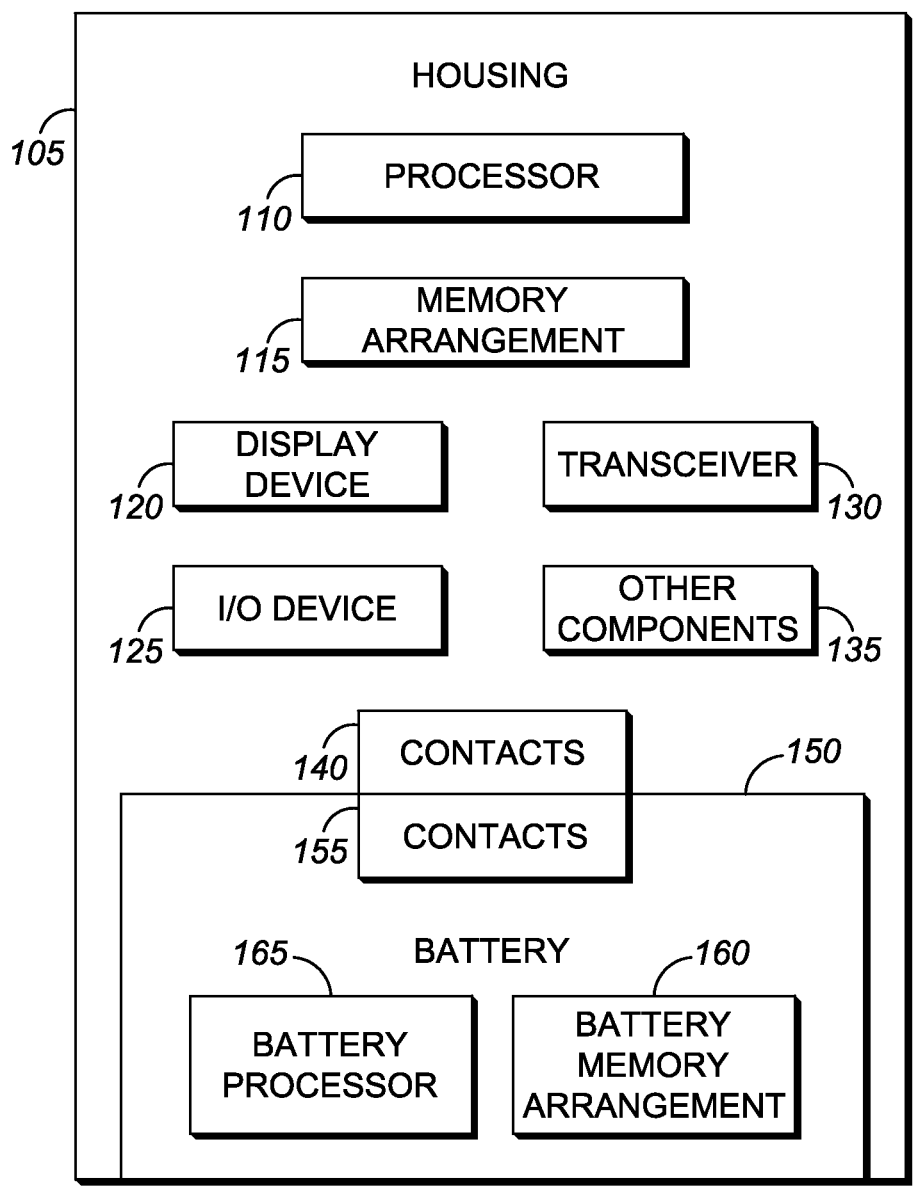
FIG. 1 shows a mobile unit with a battery having a battery memory arrangement in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present invention relates to a system that configures a mobile device. The system comprises a battery including at least one power storage cell and a memory arrangement, the memory arrangement storing staging profile data, the staging profile data including configuration data; and a mobile device configured to be coupled to the battery, the mobile device being powered by the at least one power storage cell, the mobile device receiving the staging profile data from the memory arrangement, the mobile device being automatically configured for communication with a communication network as a function of the configuration data.

The exemplary embodiments may be further understood with reference to the following description and the appended drawings, wherein like elements are referred to with the same reference numerals. The exemplary embodiments describe a system and method for staging a mobile unit (MU) such that the MU is configured to be managed and discovered on a management system of a network such as an enterprise network. Specifically, the staging of the MU is performed by loading staging profile data in a battery memory arrangement (BMA) of a battery that couples to the MU. Once the battery and the MU have been coupled and the MU has been powered using power from the battery, the staging profile data may be retrieved from the BMA such that the settings provided in the staging profile data may properly configure the MU for the management system. The MU, the staging, the management system of the network, the staging profile data, the battery, the BMA, and a related method will be discussed in further detail below.

With regard to a management system of a network such as the enterprise network, in order for the MU to properly be managed and discovered by the management system, the MU must be properly configured. Accordingly, a staging profile corresponding to the specifications of the MU (e.g., model type, transceiver type, etc.) must be installed thereon in order for the MU to be properly configured. The staging profile includes staging profile data that may be stored intermediately on a memory arrangement and transmitted to the MU. Once the staging profile data has been received by the MU, the staging profile data may subsequently be erased from the memory arrangement. As will be described in further detail below, the staging data may be stored on the BMA (e.g., an Electrically Erasable Programmable Read-Only Memory (EEPROM)) of a battery.

FIG. 1 shows a MU 100 with a battery 150 in accordance with some embodiments. The MU 100 may include a plurality of components. For example, the MU 100 may include a housing 105 that at least partially houses a plurality of electronic components such as a processor 110, a memory arrangement 115, a display device 120, an input/output (I/O) device 125, a transceiver 130, and other components 135 such as an antenna coupled to the transceiver 130, an audio output component (e.g., a speaker (not shown)); an audio input component (e.g., a microphone (not shown)); etc.

The MU 100 may be any electronic device configured to connect to a network having a management system. For example, the MU 100 may be a laptop, a cellular phone, a smartphone, a personal digital assistant, a tablet, a barcode scanner, etc. including the transceiver 130 that enables the MU 100 to transmit/receive data from the network. As will be described in further detail below, the management system of the network may be a mobility services platform (MSP).

The processor 110 may be configured to execute a plurality of applications. For example, when the MU 100 is connected to a communication network via the transceiver 130, the processor 110 may execute a web browser application. According to the exemplary embodiments, the processor 110 may execute a staging application in which staging profile data that is received may be used to configure the transceiver 130 for discovery and management by a management system of a network. The memory arrangement 115 may store data for the MU 100, particularly the staging profile data that is received. The display device 120 may show data to a user while the I/O device 125 may receive inputs from the user. The I/O device 125 may be incorporated with the display device 120 such that a touchscreen is provided.

When the MU 100 is a portable device, the MU 100 may include a portable power supply such as the battery 150. Accordingly, the battery 150 may provide the required energy necessary for activation and utilizing the MU 100. That is, the battery 150 may include storage cells holding the energy (when charged). The battery 150 may include further components such as a battery memory arrangement (BMA) 160 (e.g., an EEPROM) and optionally may include a battery processor (BP) 165. The BP 165 may be used for a variety of reasons such as those used in relation to a Smart Battery System (SBS). Since the battery 150 may include the BMA 160 such as the EEPROM, data may be stored in the battery 150 that is saved despite a power supply being disconnected from the battery 150. When the battery 150 is the EEPROM, the battery 150 provides improved battery charge management and increased efficiency than a "non-smart" battery (i.e., a portable power supply only configured to provide power). The battery 150 may include further components such as a battery gauging circuitry (not shown) and data storage circuitry like the EEPROM to store battery related data such as battery type, manufacturing date, origin, charge cycles, etc. in addition to the regular battery protection circuitry. The battery 150 is configured to intelligently communicate with the processor 110 of the MU 100 using, for example, an inter-integrated circuit (I²C) bus disposed on battery contacts 155 as well as the contacts 140 of the MU 100. Accordingly, the smart battery 150 may also include the BP 165 configured to generate the necessary data transmitted to the MU 100 or determine various data to be transmitted to the MU 100.

It should be noted that the battery 150 being a component including the BMA 160, the BP 165, and the other components described above is only exemplary. The battery 150 may be configured as a modular arrangement. In a first example, the battery 150 may be an integrated component including only the storage cells and battery contacts 155 to perform as a "non-smart" battery. However, the battery 150 may also be equipped with slots or other coupling components such that the BMA 160 and/or the BP 165 may be received. In this way, the battery 150 being a modular arrangement may be used according to the exemplary embodiments. In a second example, the battery 150 may be a battery adapter including a housing that receives various components. The various components may include the storage cells, the BMA 16, the BP 165, and/or the other components. The housing of the battery adapter may include recesses shaped and sized to receive these components. In this way, the battery 150 being a battery adapter may be used according to the exemplary embodiments.

Since the battery 150 is configured to provide the power to the MU 100 (via the storage cell storing power), select ones of the battery contacts 155 may couple to corresponding select ones of the contacts 140 of the MU 100 in order for this power to be transferred. In order for the battery 150 to communicate data with the processor 110 of the MU 100, further select ones of the battery contacts 155 may couple to corresponding further select ones of the contacts 140 of the MU 100 in order for this data to be transmitted/received.

It should be noted that the battery 150 may be specifically tailored for use with the MU 100 or by types of MUs. As shown in FIG. 1, the MU 100 may receive the battery 150 in a recess of the housing 105. The MU 100 and other MUs of the same type may include substantially similar manufacturing specifications and designs. Accordingly, the shape of the battery 150 may correspond to a shape of the recess in the housing 105. Once received, a surface of the battery 150 may be flush with the housing 105 or may be enclosed with a cover of the housing 105. The housing 105 may also optionally include a mechanical latch to secure the battery 150 within the housing 105 of the MU 100. When properly received, the contacts 140 of the MU 100 may be in contact with the battery contacts 155. This tailoring of the battery 150 for the MU 100 may also indicate various properties of the MU 100, particularly regarding staging profile data that are ultimately stored in the BMA 160 and transmitted to the processor 110 of the MU 100. Therefore, the battery 150 used with the MU 100 may include all required information to determine the staging profile data to be used with the MU 100.

It should also be noted that the battery 150 being internal with regard to the MU 100 is only exemplary. The battery 150 may also be shaped and configured to couple to an exterior of the MU 100. Accordingly, the contacts 140 of the MU 100 may be disposed on an exterior surface of the housing 105. For example, when a laptop computer is shaped with a compact design, the housing 105 may not be configured with a recess to receive the battery 150. Therefore, the battery 150 may couple to the exterior of the housing 105 in a proper configuration such that the contacts 140 are properly aligned for coupling with the battery contacts 155.

According to the exemplary embodiments, the BMA 160 of the smart battery 150 may be configured to store staging profile data as well as the battery related data discussed above. The BMA 160 of the battery 150 may include a storage capacity that allows for the staging profile data to be stored therein. However, if the BMA 160 does not have the available storage capacity, the battery 150 may utilize a different BMA 160 that does have the capability or include a separate memory arrangement component to specifically store the staging profile data.

Figure 2:
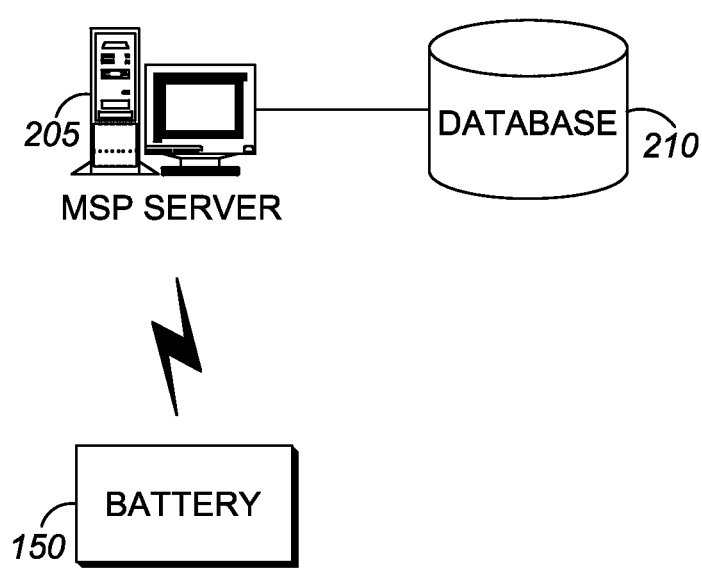
FIG. 2 shows a system for staging the mobile unit of FIG. 1 in accordance with some embodiments.

In order to store the staging profile data in the BMA 160 of the battery 150, the battery 150 may initially communicate with a component that has the staging profile data. FIG. 2 shows a system 200 for staging the MU 100 of FIG. 1 in accordance with some embodiments. Specifically, the system 200 relates to when the staging profile data is for a management system of an enterprise network that the MU 100 is to be managed and discovered. Accordingly, the system 200 may include a server 205 and a database 210. As discussed above, the management system may be a MSP in which the server 205 may be the MSP server. Therefore, when the MU 100 is properly configured, the server 205 may discover and manage the MU 100 upon connection to the network. The database 210 may store the staging profile data for each MU (or types of MUs) that is to connect to the network.

The battery 150 may communicate with the server 205 in order to receive the staging profile data and store it in the BMA 160. The data communication link between the server 205 and the battery 150 may be established using any variety of manners. In a first example, the server 205 may include a component that couples to the battery contacts 155 of the battery 150. Specifically, as discussed above, the select ones of the battery contacts 155 used for data communication may couple with the component of the server 205. Once coupled, the data may be transmitted from the server 205 to the battery 150 via the battery contacts 155 and stored in the BMA 160. In a second example, the battery 150 may include a port such that a hard-wired connection may be established with the server 205. Accordingly, the staging profile data may be transmitted. In a third example, other known manners of data transmission may be used so long as the battery 150 includes the necessary hardware components to utilize the data transmission manner (e.g., RFID, IR, Bluetooth, scanning, etc.).

The battery 150 may store the staging profile data in a variety of manners. In a first example, the battery 150 may store only the necessary staging profile data in the BMA 160. That is, only the staging profile data related to the MU 100 (or the type of the MU 100) may be stored in the BMA 160. The server 205 and/or the battery 150 (via the BP 165) may determine the staging profile data of the MU 100 in a variety of ways such as utilizing the physical characteristics such as the arrangement of the battery contacts 155 to determine the type of MU 100, retrieving already stored data in the BMA 160 indicating the type of MU 100, receiving identification data from the memory 115 of the MU 100, etc. In a second example, the smart battery 150 may store all the staging profile data in the BMA 160. Thus, when the battery 150 is coupled to the MU 100, the processor 110 may request a particular type of staging profile data from the battery 150 that is stored in the BMA 160.

Once the battery 150 has received the staging profile data and stored the data in the BMA 160, the battery 150 may be coupled to the MU 100 in a proper orientation such that the contacts 140 and the battery contacts 155 are coupled. Since the MU 100 does not have a power supply, it may be assumed that the MU 100 is deactivated or turned off. However, once the battery 150 has been coupled, the MU 100 may be powered up or activated. After the processor 110 has started up, the processor 110 may request the staging profile data from the battery 150 in order to incorporate the required settings to configure the MU 100 to be discovered and managed by the management system of the network. In an initial step, the battery 150 (via the BP 165) may determine whether the MU 100 is authorized to receive the staging profile data. For example, the specifications of the MU 100 or authenticating data may be transmitted to the battery 150 to make the determination. In another example, a user of the MU 100 may provide authentication data to the server 205 prior to the battery 150 receiving the staging profile data. This may also be used to identify which staging profile data to store in the BMA 160. If allowed, the battery 150 may continue with the request. When the BMA 160 only stores the corresponding staging profile data of the MU 100, the battery 150 may transmit this data. When the BMA 160 stores all the staging profile data for multiple MUs (or by type of MU), the battery 150 via the BP 165 may determine the staging profile data to be transmitted to the MU 100 or the processor 110 may request a particular staging profile data that is stored in the BMA 160. In another manner, the processor 110 may receive the available staging profile data from the BMA 160. The processor 110 may generate image data of the available staging profile data and show this on the display device 120. Subsequently, a user of the MU 100 may select the appropriate staging profile data via the I/O device 125.

The staging profile data may be stored in the BMA 160 in an encrypted manner. In a first example, the staging profile data stored in the database 210 may already be encrypted. Thus, when the battery 150 is communicatively coupled to the server 205, the server 205 may simply transmit the encrypted data to the smart battery 150. In a second example, the staging profile data may be retrieved by the server 205 from the database 210 and encrypted prior to transmission to the battery 150. In a third example, the staging profile data may be transmitted to the battery 150 in an unencrypted manner. Since the battery 150 may include the BP 165, the battery 150 may be configured to encrypt the staging profile data.

If the staging profile data is encrypted, the MU 100 may receive the encrypted data from the battery 150. The processor 110 may include a decryption application that is executed in order to decode the encrypted staging profile data. Accordingly, the database 210, the server 205, the battery 150, and/or the processor 110 may be configured with the encryption algorithm used to encrypt/decrypt the staging profile data.

After the staging profile data has been transmitted from the BMA 160 of the battery 150 to the processor 110 of the MU 100 via the contacts 140 and the battery contacts 155, the battery 150 may include a setting that erases the staging profile data to free the corresponding space for other data to be written on the BMA 160. For example, there may be a bit set in the battery 150 or in the staging profile data that indicates that the data is to be erased. Thus, when the bit is turned on (e.g., "1"), this may indicate that the data is to be erased while when the bit is turned off (e.g., "0"), this may indicate that the data is not to be erased. When the staging profile data is to be erased from the BMA 160, a check may be performed to ensure that the staging profile data has been properly received by the processor 110. For example, a request whether the staging profile data has been properly received may be transmitted from the battery 150 to the processor 110. If the processor 110 indicates that the staging profile data has been received, the above described erasing procedure may be performed.

Figure 3:
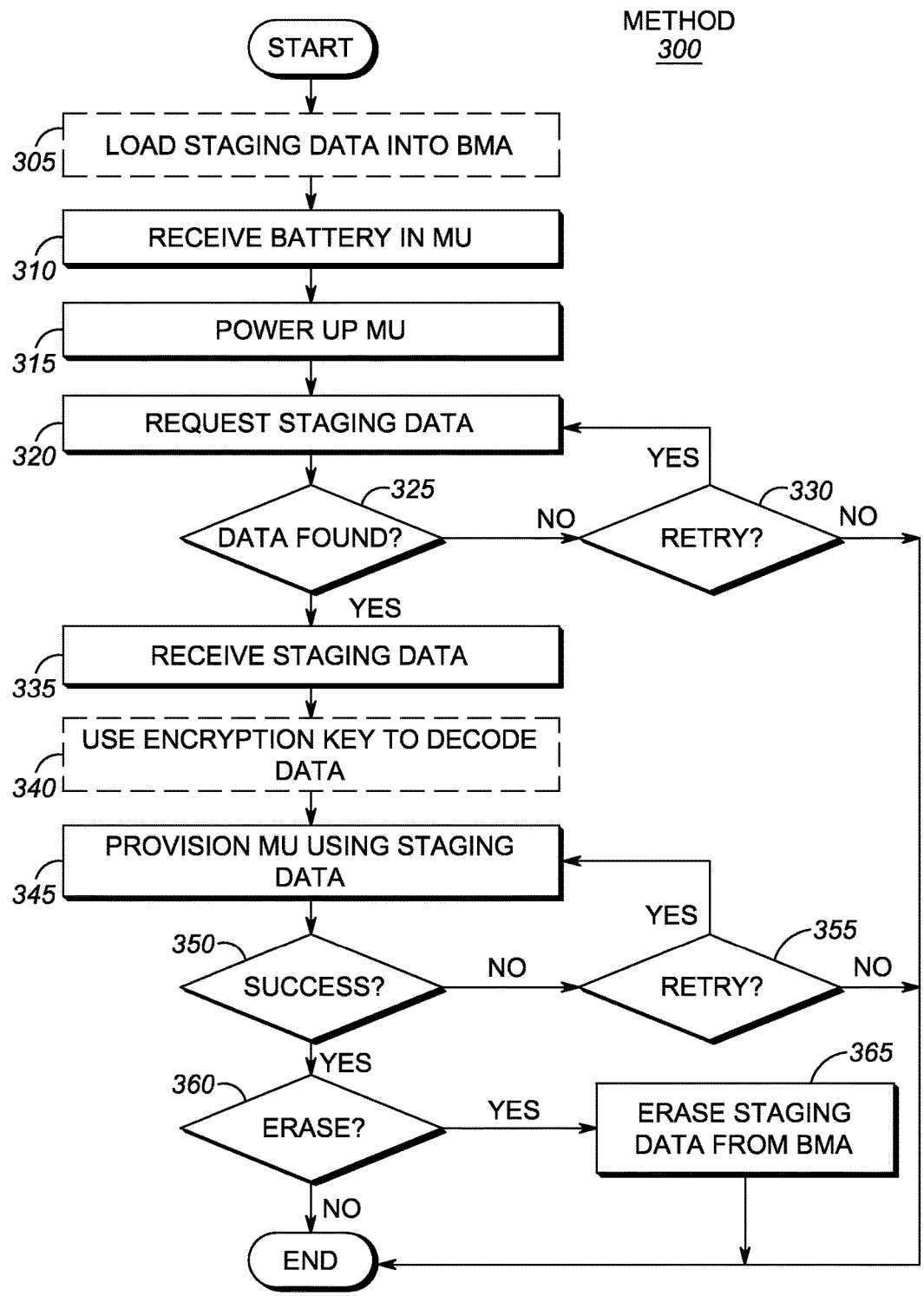
FIG. 3 shows a method for staging the mobile unit of FIG. 1 in accordance with some embodiments.

FIG. 3 shows a method 300 for staging the MU 100 of FIG. 1 in accordance with some embodiments. The method 300 relates to providing the MU 100 staging profile data via the battery 150. The battery 150 may be coupled to the MU 100 such that the contacts 140 are coupled to the battery contacts 155. The battery 150 may include the BMA 160 that stores the staging profile data. The method 300 will be described with reference to the MU 100 of FIG. 1 and the system 200 of FIG. 2

In step 305, the staging profile data is loaded onto the BMA 160. As described above, the battery 150 may establish a communicative connection to the server 205 using any of a variety of manners. The server 205 may retrieve the staging profile data from the database 210 for transmission to the battery 150. In a first exemplary embodiment, the server 205 may transmit a specific staging profile data corresponding to the MU 100 or the type of the MU 100. In a second exemplary embodiment, the server 205 may transmit a plurality of profile staging data corresponding to the various MUs or types of MUs that connect to the server 205. These profile staging data may be loaded onto the battery 150. Also as described above, the staging profile data may be encrypted by the server 205/the database 210 prior to transmitting the data or by the battery 150 upon receiving the staging profile data.

In step 310, the battery 150 is received by the MU 100. That is, the battery 150 that has the staging profile data loaded thereon in the BMA 160 is coupled to the MU 100. The battery 150 may be received in a recess of the housing 105 of the MU 100 or may be coupled externally. Once the battery 150 has been coupled to the MU 100 such that the contacts 140 of the MU 100 are properly coupled to corresponding battery contacts 155 of the battery 150, in step 315, the MU 100 is powered up as the power is being supplied via the battery 150 (e.g., storage cells).

In step 320, the processor 105 requests the staging profile data stored in the BMA 160 of the battery 150. In step 325, a determination is made whether the staging profile data is found. As discussed above, the BMA 160 may include only the staging profile data corresponding to the MU 100. Thus, the determination may be whether the BMA 160 has the staging profile data stored therein. For a variety of reasons (e.g., communication error), the determination may indicate that the staging profile data is not stored in the BMA 160 or no response may be provided to make the determination. If a first attempt to locate the staging profile data fails, the method 300 continues to step 330. In step 330, a determination is made whether a further attempt is to be performed. If a further attempt is to be made, the method 300 returns to step 320. If no further attempts are to be made, the method 300 ends.

As discussed above, the BMA 160 may include various staging profile data for the MUs or types of MUs that connect to the server 205. Thus, the determination may be whether the various staging profile data stored in the BMA 160 includes the requested staging profile data. Upon searching through the available staging profile data (via the BP 160), the determination may indicate that the requested staging profile data is not stored in the BMA 160. If a first attempt to receive the staging profile data fails, the method 300 continues to step 330. In step 330, a determination is made whether a further attempt is to be performed. If a further attempt is to be made, the method 300 returns to step 320. If no further attempts are to be made, the method 300 ends.

Returning to step 325, if the staging profile data has been found in the BMA 160, the method 300 continues to step 335. In step 335, the staging profile data is transmitted from the battery 150 to the MU 100 via select ones of the contacts 140 that are coupled to the corresponding select ones of the battery contacts 155. Once received by the MU 100, in step 340, an encryption key preprogrammed in the processor 105 (via the staging application) may be used to decode the encrypted staging profile data. Once decoded, the method 300 continues to step 345 where the MU 100 is provisioned using the staging profile data. That is, the processor 105 executes the staging application to configure the transceiver 130 with the settings included in the staging profile data in order to be discovered and managed by the management system of the network.

In step 350, a determination is made whether the MU 100 has been successfully configured with the staging profile data. If the configuration has failed, the method 300 continues to step 355. In step 355, a determination is made whether a further attempt to stage is to be performed. If a further attempt is to be made, the method 300 returns to step 345. If no further attempts are to be made, the method 300 ends.

Returning to step 350, if the configuration is successful, the method 300 continues to step 360. In step 360, the bit set in the battery 150 is checked in order to determine whether the staging profile data is to be erased from the BMA 160. If the staging profile data is to be erased, the method 300 continues to step 365 in which the staging profile data is erased. Subsequently, the method 300 ends.

The exemplary embodiments provide a system and method for staging a MU by providing staging profile data to the MU from a memory arrangement of a battery. The battery may include this memory arrangement as well as other components to initially receive the staging profile data from a server or other storage component that stores the staging profile data of the MU. Upon the battery being coupled to the MU via corresponding contacts, the MU may request the staging profile data. Upon receiving this staging profile data, the MU may be staged by being configured with the settings indicated by the staging profile data. In this manner, the MU may be properly connected to the network having a management system for discovery and management thereby.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system, comprising:
   a battery including at least one power storage cell, a battery processor, and a memory arrangement, the memory arrangement storing staging profile data, the staging profile data including configuration data for configuring predetermined types of mobile devices for network communication, wherein a mechanical shape of the battery is tailored for use with a specific type of mobile device having a corresponding mechanical recess, and the staging profile data corresponds to specifications for a predetermined type of mobile device; and
   a mobile device configured to be coupled to the battery, the mobile device being powered by the at least one power storage cell, the mobile device receiving the staging profile data corresponding to its mobile device type from the memory arrangement after the battery has powered up the mobile device, whereupon the mobile device being automatically configured for communication with a communication network as a function of the configuration data retrieved from the memory arrangement,
   wherein the battery processor is configured to encrypt the staging profile data stored in the memory arrangement of the battery, determine whether a setting, in the memory arrangement of the battery, indicating that the stored staging profile data can be erased is activated, and, when the setting is activated, transmit a request to the mobile device to determine whether the staging profile data has been received by the mobile device, and in response to the request, erase the staging profile data from the memory arrangement of the battery when the mobile device received the staging profile data.

2. The system of claim 1, wherein the memory arrangement of the battery is an electrically erasable programmable read only memory (EEPROM).

3. The system of claim 1, wherein the battery includes a connector including a first portion and a second portion, the first portion configured to conduct a power signal from the at least one storage cell to the mobile device, the second portion configured to transmit the staging profile data as a data signal from the memory arrangement of the battery to the mobile device.

4. The system of claim 3, wherein the mobile device includes a further connector configured to contact the connector, the further connector including a further first portion and a further second portion, the further first portion configured to couple to the first portion, the further second portion configured to couple to the second portion.

5. The system of claim 1, wherein the staging profile data is received from a mobility services platform (MSP) server of the communication network that generates the staging profile data.

6. The system of claim 1, wherein the battery processor is configured to determine whether the mobile device is authorized to receive the staging profile data, whereupon the battery processor determines the staging profile data to be delivered to the mobile device.

7. The system of claim 1, wherein the staging profile data corresponds to the mobile device as a function of identification data of the mobile device.

8. The system of claim 1, wherein the staging profile data includes a plurality of staging profile data, a user of the mobile device selecting one of the plurality of staging profile data for automatically configuring the mobile device.

9. The system of claim 1, wherein the battery processor is configured to determine whether the setting is activated by determining whether a predetermined bit is turned on in the memory arrangement of the battery.

10. A method of staging a mobile device for communication with a network, comprising:
providing a battery with a mechanical shape tailored for use with a specific type of mobile device having a corresponding mechanical recess;
storing staging profile data corresponding to specifications for the specific type of mobile device in a memory arrangement of a battery, the battery further including at least one power storage cell, the staging profile data including configuration data for configuring the specific type of mobile device for network communication;
encrypting, by a battery processor, the staging profile data stored in the memory arrangement of the battery;
coupling the battery to the mobile device for the mobile device to be powered by the at least one power storage cell;
after coupling and powering up the mobile device by the power storage cell,
transmitting the staging profile data for that specific type of mobile device from the memory arrangement of the battery to the mobile device;
determining whether a setting, in the memory arrangement of the battery, indicating that the stored staging profile data can be erased is activated;
when the setting is activated, transmitting a request to the mobile device to determine whether the staging profile data has been received by the mobile device;
in response to the request, erasing the staging profile data from the memory arrangement of the battery when the mobile device received the staging profile data; and
automatically configuring the mobile device for communication with a communication network as a function of the configuration data.

11. The method of claim 10, wherein the memory arrangement of the battery is an electrically erasable programmable read only memory (EEPROM).

12. The method of claim 10, further comprising:
conducting a power signal from a first portion of a connector of the battery from the at least one storage cell to the mobile device; and
transmitting the staging profile data as a data signal from a second portion of the connector of the battery from the memory arrangement of the battery to the mobile device.

13. The method of claim 12, further comprising:
coupling the first portion of the connector of the battery to a further first portion of a further connector of the mobile device; and
coupling the second portion of the connector of the battery to a further second portion of the further connector of the mobile device.

14. The method of claim 10, the staging profile data is received from a mobility services platform (MSP) server of the communication network that generates the staging profile data.

15. The method of claim 10, further comprising:
determining, by the processor of the battery, whether the mobile device is authorized to receive the staging profile data, whereupon determining, by the battery processor, the staging profile data to be delivered to the mobile device.

16. The method of claim 10, wherein the staging profile data corresponds to the mobile device as a function of identification data of the mobile device.

17. The method of claim 10, further comprising:
receiving a selection the staging profile data for automatically configuring the mobile device, the staging profile data being one of a plurality of staging profile data stored in the memory arrangement of the battery.

18. The method of claim 10, wherein determining whether the setting is activated further comprises determining whether a predetermined bit is turned on in the memory arrangement of the battery.

19. A removable battery for a mobile device, comprising:
at least one power storage cell configured to power the mobile device; and
a memory arrangement configured to store staging profile data for specific types of mobile devices, wherein a mechanical shape of the battery is tailored for use with a specific type of mobile device having a corresponding mechanical recess, and the staging profile data corresponds to specifications for the specific type of mobile device, the staging profile including configuration data for configuring the specific type of mobile device for network communication;
a battery processor configured to encrypt the staging profile data stored in the memory arrangement of the battery, determine whether a setting, in the memory arrangement of the battery, indicating that the stored staging profile data can be erased is activated, and, when the setting is activated, transmit a request to the specific type of mobile device to determine whether the staging profile data has been received by the specific type of mobile device, and in response to the request, erase the staging profile data from the memory arrangement of the battery when the specific type of mobile device received the staging profile data; and
a connector including a first portion and a second portion, the first portion of the connector configured to conduct a power signal from the at least one power storage cell to the mobile device, the second portion of the connector configured to transmit the staging profile data corresponding to the mobile device type as a data signal from the memory arrangement to the mobile device, wherein after the battery has powered up the mobile device the staging profile data being retrieved from the memory arrangement to automatically configure the mobile device for communication with a communication network as a function of the configuration data.

20. The battery of claim 19, wherein the battery processor is configured to determine whether the setting is activated by determining whether a predetermined bit is turned on in the memory arrangement of the battery.

* * * * *